United States Patent [19]

Frost

[11] Patent Number: 4,910,080

[45] Date of Patent: Mar. 20, 1990

[54] IMPREGNATING COMPOSITION AND METHOD OF USE THEREOF

[75] Inventor: George W. Frost, Woodbury, Minn.

[73] Assignee: Minnesota Mining and Manufacturing Company, St. Paul, Minn.

[21] Appl. No.: 349,640

[22] Filed: May 10, 1989

[51] Int. Cl.[4] .................. B32B 3/00; B32B 13/12
[52] U.S. Cl. .................. 428/307.3; 428/451; 428/703; 524/554; 526/282
[58] Field of Search .......... 428/307.3, 451, 703; 524/554; 526/282

[56] References Cited

U.S. PATENT DOCUMENTS

| | | | |
|---|---|---|---|
| 2,414,089 | 1/1947 | Bruson | 260/410.5 |
| 2,462,400 | 2/1949 | Hoover | 526/232.1 |
| 3,644,316 | 2/1972 | Marx et al. | 526/329.5 |
| 4,097,677 | 6/1978 | Emmons et al. | 560/220 |
| 4,197,225 | 4/1980 | Emmons et al. | 524/650 |
| 4,263,372 | 4/1981 | Emmons et al. | 428/446 |
| 4,460,625 | 7/1984 | Emmons et al. | 427/136 |

OTHER PUBLICATIONS

National Cooperative Highway Research Program Report 297, Babaei and Hawkins, Sep. 1987.

*Primary Examiner*—William J. Van Balen
*Attorney, Agent, or Firm*—Donald M. Sell; Walter N. Kirn; Dale A. Bjorkman

[57] ABSTRACT

Impregnating compositions are described comprising dicyclopentenyl acrylate or methacrylate together with a $C_5$ to $C_8$ alkyl ester of acrylic or methacrylic acid.

20 Claims, No Drawings

IMPREGNATING COMPOSITION AND METHOD OF USE THEREOF

FIELD OF THE INVENTION

This invention relates to impregnating compositions and methods of use thereof for coating porous surfaces. This invention particularly relates to mixtures of acrylate monomers to provide an impregnating composition for coating porous surfaces.

BACKGROUND OF THE INVENTION

Structures made from portland cement concrete, especially bridge decks, prematurely deteriorate due to wear from exposure to traffic, severe weather conditions and improper application of the concrete or errors in engineering. These structures develop cracks that compromise the integrity of the concrete and expose the reinforcing bars to corrosive elements. Additionally, after a few freeze/thaw cycles, cracks develop into holes that require repair. Many strategies have been employed in an attempt to protect and repair these structures, including providing a protective latex modified concrete overlay, epoxy coating the reinforcing steel, providing an asphaltic concrete/membrane system and feeding a low viscosity, low modulus polymer into the cracks in concrete decks.

U.S. Pat. Nos. 4,197,225 and 4,263,372, both to Emmons et al. describe polymer concrete compositions and coating compositions, respectively. These composition each contain dicyclopentenyl methacrylate or acrylate together with another non-volatile monomer, that is either an acrylate or ethacrylate, and a metal drier. The '372 patent, which claims only methods of using polymer containing coating compositions, is specifically limited to $C_{12}$ to $C_{30}$ alkyl and alkenyl acrylates and methacrylates as the comonomer. The '225 patent, which claims only polymer concrete compositions and products obtained from these compositions, is limited in scope of the comonomer to non-volatile monomers such as higher alkyl or alkenyl acrylates or methacrylates.

U.S. Pat. No. 4,460,625 to Emmons et al. discloses a polymer impregnate composition comprising a monomer system containing dicyclopentenyloxyalkyl or dicyclopentenyloxyalkyl ester of methacrylic acid or acrylic acid, at least one hydroxy alkyl methacrylate and a polymerization catalyst.

U.S. Pat. No. 2,462,400 to Hoover et al. discloses a coating composition prepared in solvent that comprises 20 to 50% dicyclopentenyl methacrylate and 80 to 50% of an ester of methacrylate with a saturated aliphatic monohydric alcohol having from 8 to 18 carbon atoms. This patent teaches at column 3, lines 62 to 75 that the recited relative monomer contents of the composition are essential to achieve the desired flexibility and resistance of the film to marking. The relative ratios of monomers in Example II and the indicated substitution ratios at column 3, lines 45 to 53 indicate that the shorter the alkyl chain in the alkyl portion of the methacrylate comonomer, the more total comonomer is required.

U.S. Pat. No. 2,414,089 to Bruson discloses the incorporation of dicyclopentenyl methacrylate in paints, varnishes and similar coatings, where the compounds polymerize by absorbing oxygen from the air to form tough, solvent insoluble compositions.

U.S. Pat. No. 3,644,316 to Marx et al. discloses airdrying coating agents and impregnants which contain (a) an ester of an olefinically unsaturated caroxylic acid with the acetoacetic monoester of an at least dihydric alcohol; (b) at least one other polymerizable ethylenically unsaturated compound and (c) a conventional polymerization initiator.

Previous coating materials for porous surfaces using dicyclopentenyl acrylate or similar compounds utilized comonomers in an attempt to flexibilize the coating without regard to tensile strength. These coatings, including those of the Hoover '400 and Emmons patents cited earlier, indicate that the carbon content of the acrylate or methacrylate comonomer in the alcohol portion should be greater than about 10, and the comonomer should be present as a preponderance of the monomer mixture. These coating compositions for use with concrete were unsatisfactory because either at least one of the constituent monomers was too volatile and was lost to the air, the coating was not sufficiently flexible to prevent further cracking of the concrete and/or the polymer coating composition lacked the ability to penetrate the substrate in an amount sufficient to effectively repair cracks.

SUMMARY OF THE INVENTION

The impregnating composition of the present invention comprises (a) a monomer selected from the group consisting of dicyclopentenyl acrlate and dicyclopentenyl methacrylate or a mixture thereof, and (b) a monomer selected from the group consisting of a $C_5$ to $C_8$ alkyl ester of acrylic or methacrylic acid or a mixture thereof. This composition, when mixed with a free radical initiator and optionally with a metal drier, may be applied to a porous surface to provide an excellent protective coating. The porous surface is preferably a structure made from portland cement concrete. Most preferably, the composition of the present invention is applied to weathered and cracked portland cement concrete to restore strength by reconsolidating the concrete and reducing the permeation of gas and liquids through the surface of the porous material. When applied to cracked concrete, the composition of the present invention fills the cracks and chemically cures to form a mechanical bond in the concrete.

DETAILED DESCRIPTION

The monomer composition of the present invention comprises a) a monomer selected from group consisting of dicyclopentenyl acrylate and dicyclopentenyl methacrylate or a mixture thereof, present in about 50 to 95% by weight based on total monomer weight; and (b) a monomer selected from the group consisting of a $C_5$ to $C_8$ alkyl ester of acrylic or methacrylic acid or a mixture thereof, present in about 5 to 50% by weight based on total monomer weight.

Dicyclopentenyl acrylate and dicyclopentenyl methacrylate are commonly referred to by the abbreviations DCPA and DCPMA, respectively, or generically as DCP(M)A. These monomers have the structural formula:

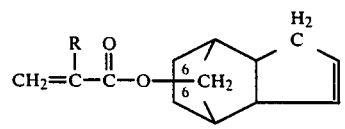

wherein R is —H or —CH$_3$. The methacryloxy substituent may be on either the 5 or 6 position. These compounds may also be called 3a,4,5,6,7,7a-hexahydro-4,7-methanoindenyl acrylate-5(or 6) or methacrylate-5(or 6).

Examples of suitable acrylic acid or methacrylic acid esters for use as the b) component of the composition include the esters of acrylic acid or methacrylic acid with alcohols such as 1-pentenol, 2-pentenol, 3-pentenol, 2-methanol-1-butanol, 1-hexanol, 2-hexanol, 2-methyl-1-pentenol, 3-methyl-1-pentenol, 2-ethyl-1-butanol, 3-heptanol, 1-octanol, 2-octanol, iso-octyl alcohol, 2-ethyl-1-hexanol and the like or mixtures thereof. Preferably, the (b) component is a C$_8$ alcohol of acrylic acid, and is most preferably iso-octyl acrylate.

The composition as described above is mixed with a free radical initiator and preferably with a metal drier and is applied to a porous surface, where it impregnates the surface and cures to form a coating.

The free radical initiator that may be used in the composition of this invention is any polymerization agent that will furnish free radicals under polymerization conditions. The initiator is used in an amount effective to produce complete polymerization of the monomer composition at 25° C. ambient temperature within at least about 24 hours. Preferably, the free radical initiator is present in an amount that is about 0.05 to 5 weight percent based on total monomer weight. Particularly preferred catalysts are organic peroxy compounds such as benzoyl peroxide and cumene hydroperoxide. The free radical initiator may be a photoinitiator, which is an agent that is sensitive to ultraviolet light as would be provided in sunlight or in UV lamps. Examples of such a photoinitiator are acetophenones, such as 2,2-dimethoxy-2-phenylacetophenone (commercially available as Irgacure 651 from Ciba-Geigy Corp., Hawthorne, N.Y.) and diethoxyacetophenone; benzil; and benzoin ethers.

The impregnating composition may contain mixtures of two or more different free radical initiators. For example, both an organic peroxy compound and a photoinitiator may be utilized to provide a rapid cure with particularly rapid cure of the outermost layer of the coating from exposure to light.

A metal drier is incorporated in the composition in an amount effective to enhance speed and completeness of cure of the impregnating composition. Thus, when only a photoinitiated free radical initiator is utilized, the incorporation of a metal drier is particularly desirable to assure complete cure of the composition throughout the permeated concrete. When the free radical initiator is an organic peroxide, the additional use of a metal drier is desirable to provide a more rapid cure of the polymer than would be possible in the absence of the metal drier. Typically, the metal drier is present in the composition in amounts of about 0.0005 to 2 weight percent of metal based on total monomer weight.

Metal driers include polyvalent metal salts of inorganic acids or aliphatic acids and oxides of the metals. Examples of such salts include the chloride, nitrate, borate, sulfate, acetate, acetyl acetonate, propionate, butyrate, pentanoate, octoate, hexoate and naphthenate. Additionally, the metal drier may be the salt f such complex acids as resinic acid, tall oil fatty acids, linseed oil fatty acids, lauric acids, palmitic acid, myristic acid, stearic acid, oleic acid, linoleic acid, linolenic acid, behenic acid, cerotic acid, montanic acid and abietic acid. Examples of the polyvalent metal include calcium, copper II, zinc II, manganese II, manganese III, lead II, cobalt II, cobalt III, iron III, vanadium II, vanadium III and zirconium IV.

When the monomer mixture is stored in the presence of a metal drier, the composition may also contain a volatile reaction inhibitor to prevent premature polymerization of the monomers before application to the desired substrate. Because these inhibitors are volatile, they dissipate in the air upon application of the composition to the substrate and no longer inhibit the polymerization reaction. Preferred inhibitors include volatile oximes such as methylethyl ketone-oxime, methylbutyl ketone-oxime, 5-methyl-3-heptanone-oxime, cyclohexanone-oxime and butyraldehyde-oxime. Volatile reaction inhibitors are present in an effective amount, preferably in amounts of about 0.1 to 2% by weight based on total monomer weight.

Amine accelerators may also be incorporated in the composition just before application to reduce cure time, especially when the composition is to be used in cold weather conditions. Examples of amine accelerators are aniline; N,N-dimethylaniline; N,N-diethylaniline; toluidine; N,N-dimethyl-p-toluidine; N-ethyl,N-hydroxyethyl-m-toluidine; 2,2'-(m-tolylimino)diethanol; N,N-di(-hydroxyethyl)toluidine and the like. These amine accelerators are present in an amount effective to reduce cure time, preferably about 0.01 to 2% by weight based on total monomer weight.

The composition of the present invention may additionally comprise minor amounts of additives, such as coloring agents, stabilizers, thickeners, rheological modifiers, preservatives or anticorrosive agents. Most preferably, any such additives do not contain particles that are larger than the average pore size on the surface to be coated, which would inhibit penetration of the composition into the substrate.

The composition may also comprise small amounts of silane coupling agents to enhance the bond between the polymer and portland cement concrete aggregate.

The composition of the present invention is typically provided as a three-part mixture providing both classes of monomers in the indicated ratios in one container, the metal drier in a second container, and the free radical initiator in the third container. The free radical initiator can never be combined with the metal drier without the monomer present due to the violent reaction that would ensue. Alternatively, this composition may be provided s a two-part system. In such a system, the monomers are provided in one container, optionally together with a metal drier and a volatile reaction inhibitor. The free radical reaction initiator is provided in a separate container and is mixed together with the monomer mixture at the site of application.

The composition of the present invention is optimally mixed at the site of application, and applied to the surface using a brush or squeegee. When the composition is used on a traffic surface, sand may optionally be spread over the composition as it dries in order to provide additional traction to the surface.

When all components are mixed, the resulting coating composition possesses a number of unexpected and desirable properties that make it particularly well adapted to coating porous surfaces such as portland cement concrete. The composition has an initial viscosity of between about 5 and 15 centipoise at 25° C. This viscosity provides an excellent capability of penetrating hairline cracks in the concrete, providing a greater degree of strength and better sealing capabilities. This property is particularly important under high application temperature conditions, where the length of time that the composition is workable is short due to quicker cure times. For example, it is estimated that a crack that is about 0.2 mm thick will be penetrated at least about 5 to 8 cm. Additionally, the resulting composition is sufficiently low in viscosity that it will soak into uncompromised concrete before cure to further consolidate the concrete material. Typically, a penetration of about 0.5 to 1.5 cm. is observed in uncracked concrete. It was not expected that a sufficiently low viscosity to achieve these penetration results could be provided by such an acrylate mixture, because very low molecular weight acrylate monomers that would be mixed with the DCP(M)A would also tend to be highly volatile and would be lost to the atmosphere before curing.

Due to the excellent penetration capability of the compositions of this invention, the composition will at least partially impregnate the body of the porous material before curing. While not being bound by any theory, it is believed that the cured composition essentially entraps the porous material in a polymer matrix, thereby deeply anchoring the polymer within the treated structure.

The composition of the present invention preferably maintains an optimum penetration viscosity (between about 5 and 15 centipoise) for about 1-2 hours, but cures to a hardened coating within about six hours and most preferably about four hours at a temperature of about 25° C. ambient temperature. Shorter cure times are generally observed when the amount of b) component comonomer is relatively low. The composition of the present invention, therefore, provides an ideals system for coating bridge decks and other traffic areas where it is desirable to minimize interruption of traffic flow. Thus, this composition may optimally be applied satisfactorily between rush hours on a typical business day.

The composition of the present invention exhibits outstanding and unexpected tensile properties. In the intended optimal use of the compositions as coatings for portland cement concrete, the coatings are expected to withstand various tensile forces experienced by the underlying substrate in normal use conditions. The uppermost layer of such structures experiences tensile forces as a result of freeze/thaw cycles and expansion of internal steel reinforcing members due to corrosion, as well as compressive forces from traffic use. The present composition provides desirable properties of tensile strength and total energy value (also known as toughness or work to failure).

Tensile measurements may be obtained using standard ASTM tensile test methods such as ASTM D638. For example, a 6 mm square cross-sectional area dog bone sample of neat polymer (a polymer that is cured in bulk without impregnating a porous substrate) formed using a mold made from Teflon ® material is tested in a tensile tester, preferably at a relatively slow strain rate because of the brittle nature of the material. Thus, while the ultimate tensile strength of portland cement concrete is about 400,000 kg/m$^2$, the composition of the present invention surprisingly possesses an ultimate tensile strength that is higher than portland cement concrete. Optimally, the composition of the present invention possesses an ultimate tensile strength and a total energy value that is higher even than neat 100% dicyclopentenyl acrylate or methacrylate. This unexpectedly high ultimate tensile strength and total energy value is particularly observed in compositions containing a C$_8$ ester of acrylic acid, and most particularly in compositions containing iso-octyl acrylate.

The following examples are presented to further illustrate the invention, and are not intended to limit the scope of the invention in any way. All parts recited are by weight.

EXAMPLE 1

To 80 parts of dicyclopentenyl methacrylate (commercially available from Alcolac Inc., Baltimore, Md.) was added 20 parts of iso-octyl acrylate and 2 parts of a 6% cobalt naphthenate catalyst system (commercially available as Nap-All ® from Mooney Chemicals, Inc., Cleveland, Ohio) with mixing. To this composition was added 4 parts of 83% active cumene hydroperoxide (commercially available from Pennwalt Corporation, Inorganic Chemicals Division, Philadelphia, Pa.). This composition was immediately applied to a portland cement concrete bridge deck at an application rate of about 2.5 square meters per liter. The composition was spread by a squeegee and brushes, and cured to a non-tacky finish in less than about hours on a breezy, sunny 25° C. day.

EXAMPLE 2

A composition was prepared as in Example 1, except that 2-ethyl hexyl acrylate is used instead of iso-octyl acrylate. About 15 ml of this composition was poured into a 10×15 cm aluminum plan, so that the resulting coating was about 5 mm thick. This composition cured to a non-tacky finish in about 6 hours at about 25° C. ambient temperature.

EXAMPLE 3

To 80 parts of dicyclopentenyl methacrylate was added 20 parts of iso-octyl acrylate and 2 parts of a 6% cobalt naphthenate catalyst system with mixing. To this composition was added 4 parts of 50% active benzoyl peroxide (commercially available as BBF 50 from Noury Chemicals, Burt, N.Y.) and 0.05 parts of N-ethyl,N-hydroxyethyl-m-toluidine. This composition was immediately applied to a portland cement concrete garage deck at an application rate of about 2.5 square meters per liter. The composition was spread by a broom, and cured to a non-tacky finish in direct sunlight in about 3 hours.

Recrack Strength vs Penetration

To demonstrate the importance of penetration of polymer impregnate compositions to the strength of the ultimate structure, the following test was performed.

Two 5×5×15 cm portland cement concrete blocks were broken in half in an Instron model TTCM13 universal tester instrument. The pieces were realigned and a bead of silicone was applied on three edges of the cracked block and around the perimeter of the untreated face of the block to allow a pool of impregnating composition to collect on the top of the block.

A polymer impregnating composition comprising 35 parts of 2-ethyl hexyl acrylate, 65 parts of dicyclopentenyl acrylate, 2 parts of 6% cobalt naphthenate and 4 part of 3% active cumene hydroperoxide was prepared. This composition was immediately applied to the block as described above and allowed to penetrate the crack when its viscosity was about 15 centipoise. After about 2 hours, the viscosity of the same stock solution had reached between about 2,000–3,000 centipoise, and was applied in the same manner to the second block. The crack in the first block was observed to have been completely impregnated by the composition while the crack in the second block was impregnated to about half the total depth of the block.

The two blocks were placed in the same instrument and subjected to the same compressive force at a strain rate of 1.27 cm. per minute, with the amount of force required to crack the block being measured. Percent retention of recrack strength is defined as $$\% \text{ retention} = \left(\frac{x-z}{y-z}\right) \times 100,$$

where x is the amount of force required to recrack the block after application of the composition, y is the amount of force required to crack the block the first time, and z is the force required to recrack a cracked block provided with a bead of silicone as described above but without application of an impregnating composition.

The first block, having complete penetration of the crack by the polymer impregnate composition, had a recrack strength of about 77.5% with a fracture line that was partly along the original crack and partly in a previously uncracked portion of the block. The second block, having only partial penetration of the more viscous polymer composition, had a recrack strength of about 7.4% with a fracture line coincident with the original crack.

I claim:
1. A monomer composition comprising
   (a) a monomer selected from the group consisting of dicyclopentenyl acrylate and dicyclopentenyl methacrylate or a mixture thereof, present in about 50 to 95% by weight based on total monomer weight; and
   (b) a monomer selected from the group consisting of a $C_5$ to $C_8$ alkyl ester of acrylic or methacrylic acid or a mixture thereof, present in about 5 to 50% by weight based on total monomer weight.
2. The composition of claim 1 wherein component (b) is iso-octyl acrylate.
3. The composition of claim 1 wherein component (b) is 15 to 30 weight percent of the total monomer weight.
4. The composition of claim 1, additionally comprising an effective amount of a metal drier and an effective amount of a volatile reaction inhibitor.
5. An impregnating composition for coating porous surfaces comprising
   (a) a monomer selected from the group consisting of dicyclopentenyl acrylate and dicyclopentenyl methacrylate or a mixture thereof, present in about 50 to 95% by weight based on total monomer weight;
   (b) a monomer selected from the group consisting of a $C_5$ to $C_8$ alkyl ester of acrylic or methacrylic acid or a mixture thereof, present in about 5 to 50% by weight based on total monomer weight; and
   (c) an effective amount of a free radical initiator.
6. The composition of claim 5 additionally comprising an effective amount of a metal drier.
7. The composition of claim 5 wherein the free radical initiator is an organic peroxide.
8. The composition of claim 5 wherein the free radical initiator is a photoinitiator.
9. The composition of claim 5 comprising two free radical initiators, one being an organic peroxide and the other being a photoinitiator.
10. The composition of claim 6 additionally comprising an effective amount of a volatile reaction inhibitor.
11. The composition of claim 5 wherein the alkyl ester of acrylic acid is derived from $C_8$ alcohol.
12. The composition of claim 11 wherein the alkyl ester of acrylic acid is iso-octyl acrylate.
13. The composition of claim 5 wherein component (b) is present as 15 to 30 by weight of the total monomer weight.
14. The composition of claim 5 having a viscosity one hour after mixing of between about 5 and 15 centipoise when the composition is maintained at a temperature of 25° C.
15. The composition of claim 5 wherein the ultimately formed neat polymer has an ultimate tensile strength and total energy value that is greater than pure dicyclopentenyl acrylate or dicyclopentenyl methacrylate.
16. The composition of claim 5, wherein said composition cures to a non-tacky hardened coating in less than about 6 hours.
17. The method of coating a porous surface comprising applying the composition of claim 5 to the porous surface and allowing said composition to cure to a non-tacky hardened coating.
18. The method of claim 17 wherein said composition cures to a non-tacky hardened coating within about 6 hours.
19. An article comprising a porous surface that has been coated with the impregnating composition of claim 5.
20. The article of claim 19 wherein the porous surface is made from portland cement concrete.

* * * * *

UNITED STATES PATENT AND TRADEMARK OFFICE
CERTIFICATE OF CORRECTION

PATENT NO. : 4,910,080

DATED : March 20, 1990

INVENTOR(S) : George W. Frost

It is certified that error appears in the above-identified patent and that said Letters Patent is hereby corrected as shown below:

Col. 1, Line 30, "These composition" should be -- These compositions --.

Col. 1, Line 33, "ethacrylate" should be -- methacrylate --.

Col. 2, Line 1, "caroxylic" should be -- carboxylic --.

Col. 2, Line 28, "acrlate" should be -- acrylate --.

Col. 2, formula, "  " should be -- 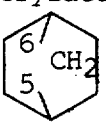 --.

Col. 6, Line 22, add -- 4 -- before the word "hours".

Col. 6, line 62, "3%" should be -- 83% --.

Col. 6, Line 63, delete "the" add therefor -- one --.

Signed and Sealed this

Twentieth Day of August, 1991

*Attest:*

HARRY F. MANBECK, JR.

*Attesting Officer*   *Commissioner of Patents and Trademarks*